(12) United States Patent
Magdych et al.

(10) Patent No.: US 6,513,122 B1
(45) Date of Patent: Jan. 28, 2003

(54) SECURE GATEWAY FOR ANALYZING TEXTUAL CONTENT TO IDENTIFY A HARMFUL IMPACT ON COMPUTER SYSTEMS WITH KNOWN VULNERABILITIES

(75) Inventors: James S. Magdych, Chino, CA (US); Tarik Rahmanovic, Germantown, MD (US); John R. McDonald, Jacksonville, FL (US); Brock E. Tellier, Stamford, CT (US); Anthony C. Osborne, Sydney (AU); Nishad P. Herath, Sydney (AU)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/895,500

(22) Filed: Jun. 29, 2001

(51) Int. Cl.⁷ .................................................. H04L 9/00
(52) U.S. Cl. ......................... 713/201; 713/200; 713/188
(58) Field of Search ................................ 713/200, 201, 713/153, 188; 709/223

(56) References Cited

U.S. PATENT DOCUMENTS

| | | | |
|---|---|---|---|
| 5,319,776 A | 6/1994 | Hile et al. ................... 395/575 |
| 5,414,650 A | * 5/1995 | Hkhuis ......................... 341/51 |
| 5,623,601 A | 4/1997 | Vu ........................ 395/187.01 |
| 5,649,095 A | * 7/1997 | Cozza ......................... 711/113 |
| 5,835,726 A | 11/1998 | Shwed et al. ........... 395/200.59 |
| 6,052,788 A | 4/2000 | Wesinger, Jr. et al. ...... 713/201 |
| 6,061,798 A | 5/2000 | Coley et al. ................. 713/201 |
| 6,098,172 A | 8/2000 | Coss et al. ................... 713/201 |
| 6,119,165 A | 9/2000 | Li et al. ...................... 709/229 |
| 6,182,226 B1 | 1/2001 | Reid et al. ................... 713/201 |
| 6,205,551 B1 | * 3/2001 | Grosse ........................ 713/201 |
| 6,263,444 B1 | * 7/2001 | Fujita ......................... 380/255 |
| 6,279,113 B1 | * 8/2001 | Vaidya ........................ 709/229 |
| 6,321,336 B1 | * 11/2001 | Applegate et al. .......... 709/220 |

FOREIGN PATENT DOCUMENTS

WO          01/16664 A1     3/2001      ............. G06E/1/00

* cited by examiner

*Primary Examiner*—Ly V. Hua
(74) *Attorney, Agent, or Firm*—Silicon Valley IP Group, LLC; Kevin J. Zilka; Christopher J. Hamaty

(57) ABSTRACT

A system, method and computer program product are provided for detecting attacks on a network. Initially, data is received from a remote source which is destined for a target. A portion of such data is then discarded based on a predetermined set of rules utilizing a firewall which is coupled to the remote source. Remaining data is subsequently passed to an intrusion detection system coupled between the firewall and the target. Such data is parsed to identify data representing text (i.e. ASCII or UNICODE text) therein utilizing the intrusion detection system. Thereafter, the data representing text- is compared to a predetermined list of data representing text-associated with attacks utilizing the intrusion detection system. Based on the comparison, some of the data representing text are marked as hostile. The data representing text-that are marked as hostile are then acted upon in order to prevent an attack.

12 Claims, 7 Drawing Sheets

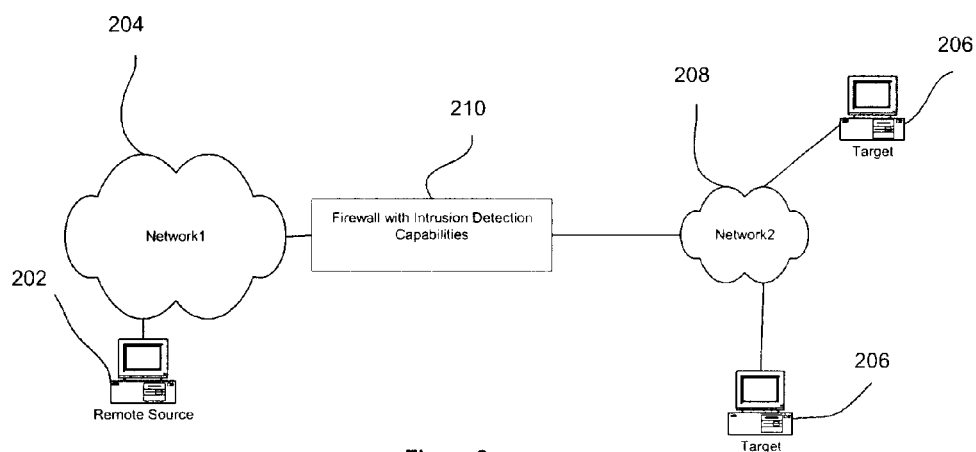
Figure 2
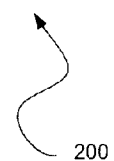

SECURE GATEWAY FOR ANALYZING
TEXTUAL CONTENT TO IDENTIFY A
HARMFUL IMPACT ON COMPUTER
SYSTEMS WITH KNOWN
VULNERABILITIES

FIELD OF THE INVENTION

The present invention relates to firewalls, and more particularly to firewalls having security capabilities.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capability in order to cause denial of service; and so forth.

Network security risk-assessment tools, i.e. "scanners," may be used by a network manager to simulate an attack against computer systems via a remote connection. Such scanners can probe for network weaknesses by simulating certain types of security events that make up an attack. Such tools can also test user passwords for suitability and security. Moreover, scanners can search for known types of security events in the form of malicious programs such as viruses, worms, and Trojan horses.

Prior art FIG. 1 illustrates a network architecture 100 in which a scanner may be implemented, in accordance with the prior art. As shown, a remote source 102 is provided which is coupled to a network such as the Internet 104 for scanning purposes. Also included is a plurality of target devices 106, i.e. computers, coupled to another network such as a virtual local area network (VLAN) 108, or some other type of "switched" network. In use, it is very difficult for the remote source 102 to access the target devices 106 due to a firewall 110 coupled between the Internet 104 and the LAN 108, thus frustrating the scanning procedure.

The firewall 110 is adapted for isolating the VLAN 108 and the target devices 106 from access through the Internet 104 attached thereto. The purpose of the firewall 110 is to allow the VLAN 108 and the target devices 106 to be attached to, and thereby access, the Internet 104 without rendering them susceptible to hostile access from the Internet 104. If successful, the firewall 110 allows for the VLAN 108 and the target devices 106 to communicate and transact with the Internet 104 without rendering them susceptible to attack or unauthorized inquiry over the Internet 104. One technique that may be used by the firewall 110 to protect the target devices 106 is known as an "access control list". An access control list investigates address information contained in a data packet to determine whether the remote source 102, from which the packet originated, is on a list of disallowed addresses. If the address is on the list, the packet is not allowed to pass. Yet another method of restricting access involves "packet filtering". Packet filtering examines data traversing the firewall 110 to determine if the port or protocol in use is subject to various restrictions that may be specified by the user. If the port or protocol in use is restricted, the packet is not allowed to pass.

The firewall 110 also may use an application gateway, or proxy system. Such systems operate on the basis of an application, or a computing platform's operating system (OS), monitoring "ports" receiving incoming connection requests. A port is a numerically designated element contained in the overhead of a packet. A port number indicates the nature of a service associated with a packet. For example, a packet associated with the Telnet service has a port number of 23, and the HTTP service is assigned port number 80. These port number designations are merely industry suggested. A packet containing a port designation of 23 need not necessarily be associated with Telnet services. When the OS or monitoring application receives a request on a particular port, a connection is opened on that port. A program for managing the connection is then initiated, and the firewall 110 starts a gateway application, or proxy, that validates the connection request.

Firewalls 110 typically restrict access based only on address/port/protocol information. Further, proxying firewalls 110 validate communications merely to ensure that requests conform to known standards (e.g. HTTP/1.x). Unfortunately, firewalls 110 do not typically examine content of communications for security purposes. There is thus a need for a firewall 110 that validates conforming communications to determine if the content of such communications could be part of an attempt to carry out an attack.

DISCLOSURE OF THE INVENTION

A system, method and computer program product are provided for detecting attacks on a network. Initially, data is received from a remote source which is destined for a target. A portion of such data is then discarded based on a predetermined set of rules utilizing a firewall which is coupled to the remote source. Remaining data is subsequently passed to an intrusion detection system coupled between the firewall and the target. Such data is parsed to identify data representing text (i.e. ASCII or UNICODE text) therein utilizing the intrusion detection system. Thereafter, the data representing text is compared to a predetermined list of data representing text associated with attacks utilizing the intrusion detection system. Based on the comparison, some of the data representing text is marked as hostile. This data representing text that is marked as hostile is then acted upon in order to prevent an attack.

In one embodiment, the firewall may utilize the predetermined set of rules to discard the data as a function of a plurality of parameters such as a source, a destination, and/or a port associated with the data. As an option, the predetermined list of data representing text associated with attacks may be updated.

In another embodiment, the data representing text of the predetermined list may refer to different types of attacks. For example, the types of attacks may include an information gathering attack, a web server denial of service attack, and/or a file server remote compromise.

In still another embodiment, the data representing text marked as hostile may be acted upon differently based on the type of the attack. In particular, the data representing text marked as hostile may be acted upon by alerting an administrator, blocking the data, and/or disconnecting the remote source.

In still yet another embodiment, the data may be parsed to identify binary data representing protocol field values. As such, the binary data may be compared to a predetermined list of patterns of binary data associated with attacks.

As an option, the firewall may include a proxying firewall. Still yet, the firewall may include an application gateway.

BRIEF DESCRIPTION OF THE DRAWINGS

Prior art

FIG. 2 illustrates a network architecture including a firewall device, in accordance with the one embodiment.

DESCRIPTION OF THE PREFERRED EMBODIMENTS

Figure 1:
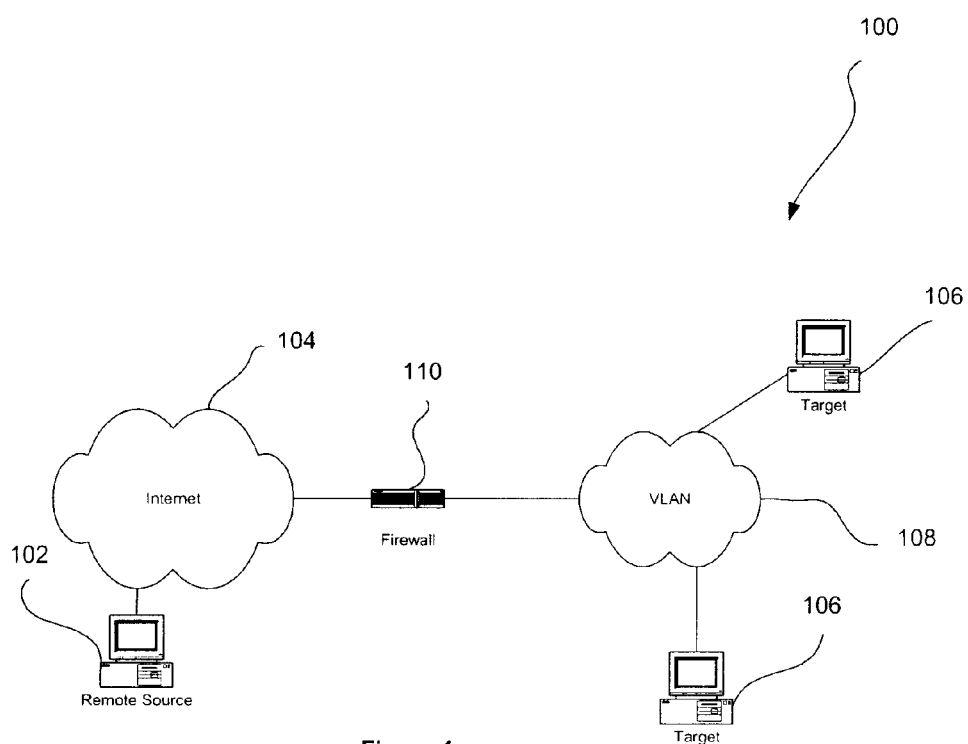
FIG. 1 illustrates a network architecture in which a scanner may be implemented, in accordance with the prior art.

FIG. 2 illustrates a network architecture 200, in accordance with the one embodiment. As shown, a remote source 202 is provided which is coupled to a first network 204. Also included is a plurality of targets 206 coupled to a second network 208. In the context of the present network architecture 200, the first network 204 and the second network 208 may each take any form including, but not limited to a local area network (LAN), a wide area network (WAN) such as the Internet, etc. Further, the targets 206 may include desktop computers, lap-top computers, hand-held computers, printers or any other type of hardware/software.

In use, the remote source 202 may attempt to access any one of the targets 206 by way of firewall device 210 coupled between the first network 204 and the second network 208 for communication purposes, i.e. executing a scanning procedure. In one embodiment, the firewall device 210 may also incorporate an application gateway, or proxy system.

Figure 3:
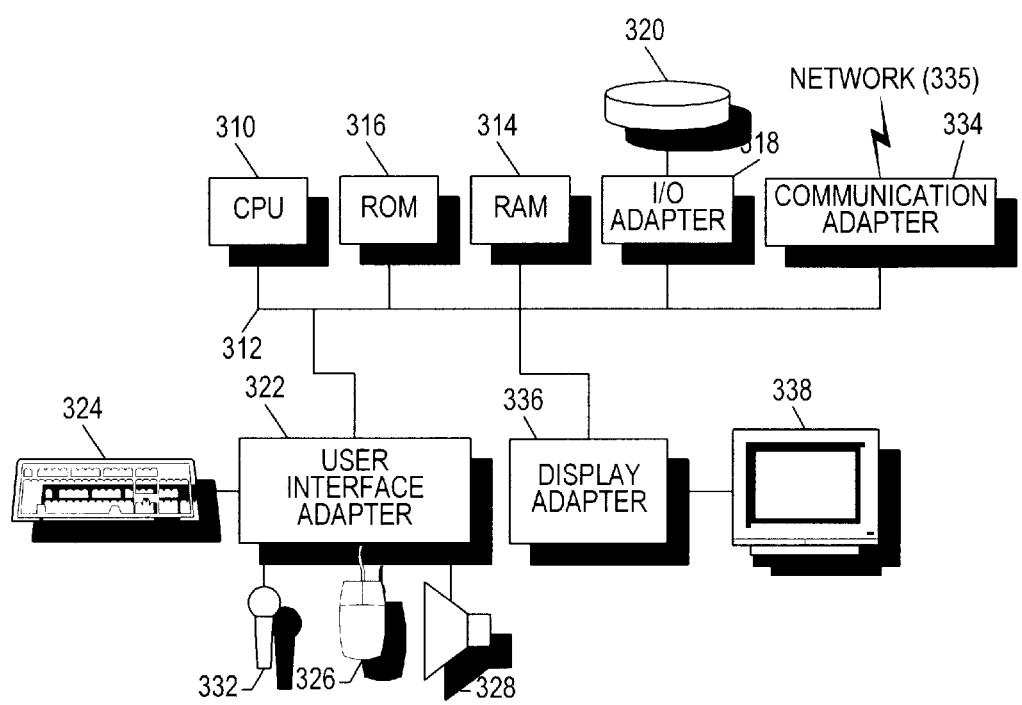
FIG. 3 shows a representative hardware environment associated with the components of FIG. 2, in accordance with one embodiment.

FIG. 3 shows a representative hardware environment that may be associated with the remote source 202 and/or targets 206 of FIG. 2, in accordance with one embodiment. Such figure illustrates a typical hardware configuration of a workstation in accordance with a preferred embodiment having a central processing unit 310, such as a microprocessor, and a number of other units interconnected via a system bus 312.

The workstation shown in FIG. 3 includes a Random Access Memory (RAM) 314, Read Only Memory (ROM) 316, an I/O adapter 318 for connecting peripheral devices such as disk storage units 320 to the bus 312, a user interface adapter 322 for connecting a keyboard 324, a mouse 326, a speaker 328, a microphone 332, and/or other user interface devices such as a touch screen (not shown) to the bus 312, communication adapter 334 for connecting the workstation to a communication network 335 (e.g., a data processing network) and a display adapter 336 for connecting the bus 312 to a display device 338.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 4:
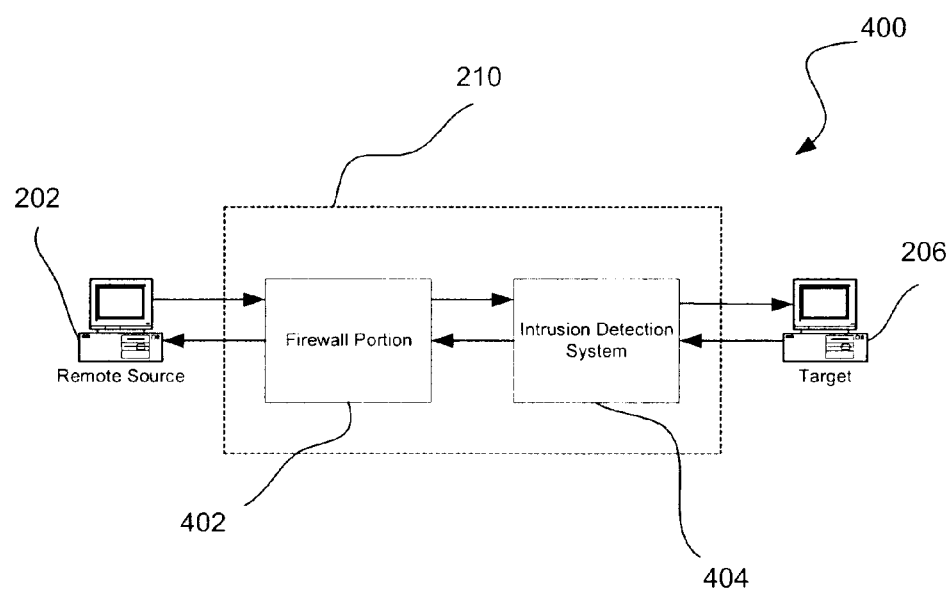
FIG. 4 illustrates an exemplary firewall architecture associated with the firewall device of FIG. 2.

FIG. 4 illustrates an exemplary firewall architecture 400 associated with the firewall device 210 of FIG. 2, in accordance with one embodiment. As shown, the firewall architecture 400 includes a firewall portion 402 and an intrusion detection system 404 serially coupled between the remote source 202 and the targets 206 via the associated networks. In particular, the remote source 202 is coupled to the firewall portion 402 which, in turn, is coupled to the intrusion detection system 404 that communicates with the targets 206.

In use, the firewall portion 402 of the firewall architecture 400 is capable of packet filtering. As mentioned earlier, packet filtering involves the investigation of port or protocol information contained in a data packet to determine whether the remote source 202, from which the packet originated, is permitted to communicate via the network in this manner. If the port or protocol is restricted, the packet is not allowed to pass. Moreover, the firewall portion 402 may also serve as a gateway, or proxy system.

Accordingly, the firewall portion 402 may utilize a predetermined set of rules to discard received data as a function of a plurality of parameters such as a source, a destination, and/or a port associated with data. Remaining data is subsequently passed to the intrusion detection system 404. For reasons that will soon become apparent, the firewall portion 402 is capable of generating a session flag upon the receipt of packets that represent the start of a new session. In the context of the present description, a session refers to a series of interactions between the remote source 202 and any one of the targets 206.

Figure 5:
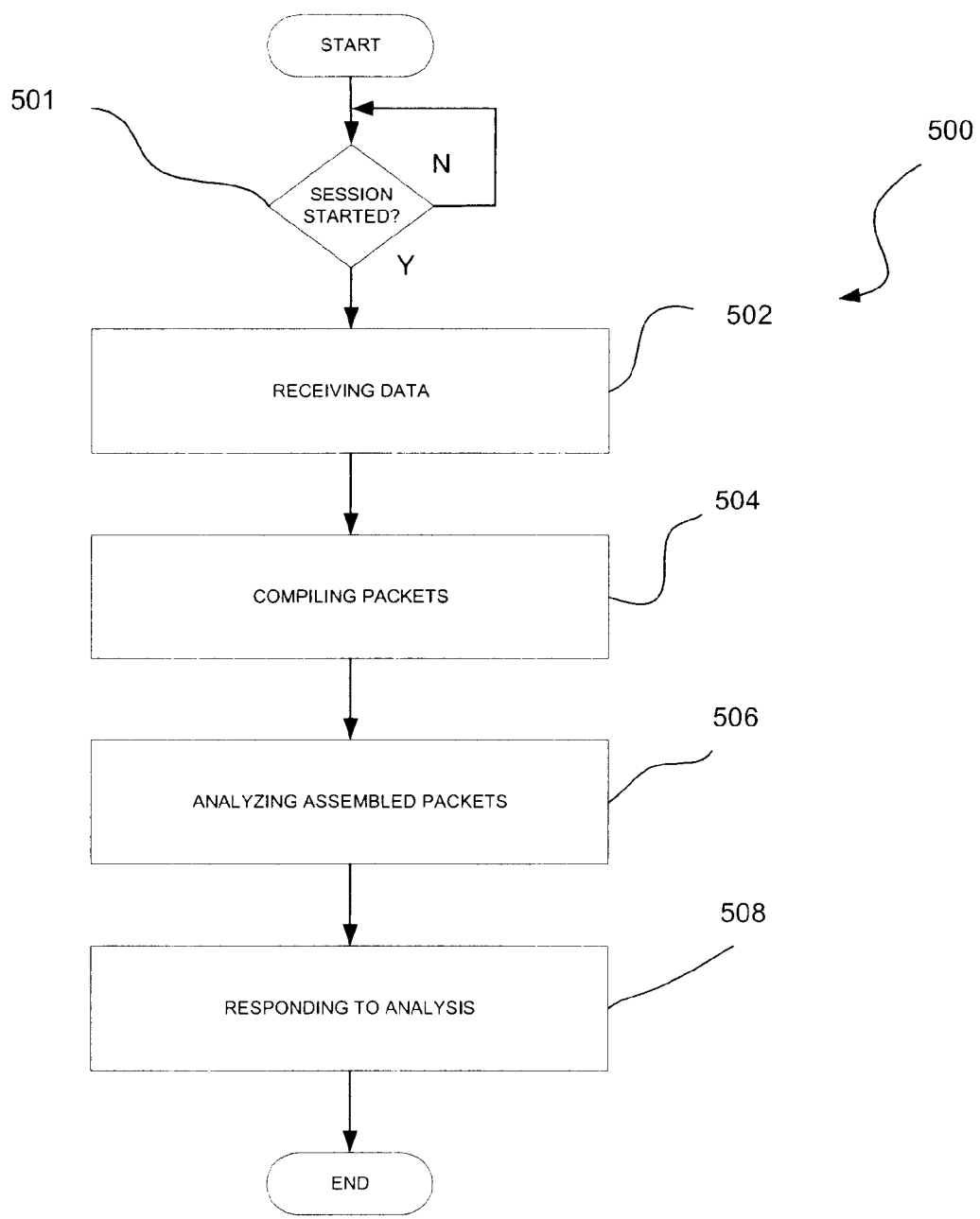
FIG. 5 illustrates a method for detecting attacks on a network which is carried out by the intrusion detection system of FIG. 4.

FIG. 5 illustrates a method 500 carried out by the intrusion detection system 404 of FIG. 4 for detecting attacks on a network. Initially, it is determined whether a session has been started in decision 501. In one embodiment, the firewall portion 402 of the firewall architecture 400 is capable of polling until the receipt of the aforementioned session flag from the firewall portion 402 of the firewall architecture 400.

Upon the start of a session, data is received from the remote source 202 which is destined for one of the targets 206. See operation 502. As mentioned earlier, a portion of such data is previously discarded based on the predetermined set of rules utilizing the firewall portion 402 of the firewall architecture 400. It should be noted that the data currently takes the form of a plurality of packets. In order for the intrusion detection system 404 to more effectively accomplish its task, the packets are compiled, or assembled, in operation 504. This may be accomplished utilizing the header information associated with each packet in a manner that is well known to those of ordinary skill in the art of Transmission Control Protocol/Internet Protocol (TCP/IP).

Next, the assembled packets are analyzed in operation 506 for the purpose of identifying content that may be harmful to known vulnerabilities of the target devices 206. More information regarding such analysis will be set forth in greater detail during reference to FIG. 6. Once the analysis is complete, the intrusion detection system 404 is capable of responding to an intrusion in operation 508, as will be elaborated upon during reference to FIG. 7.

Figure 6:
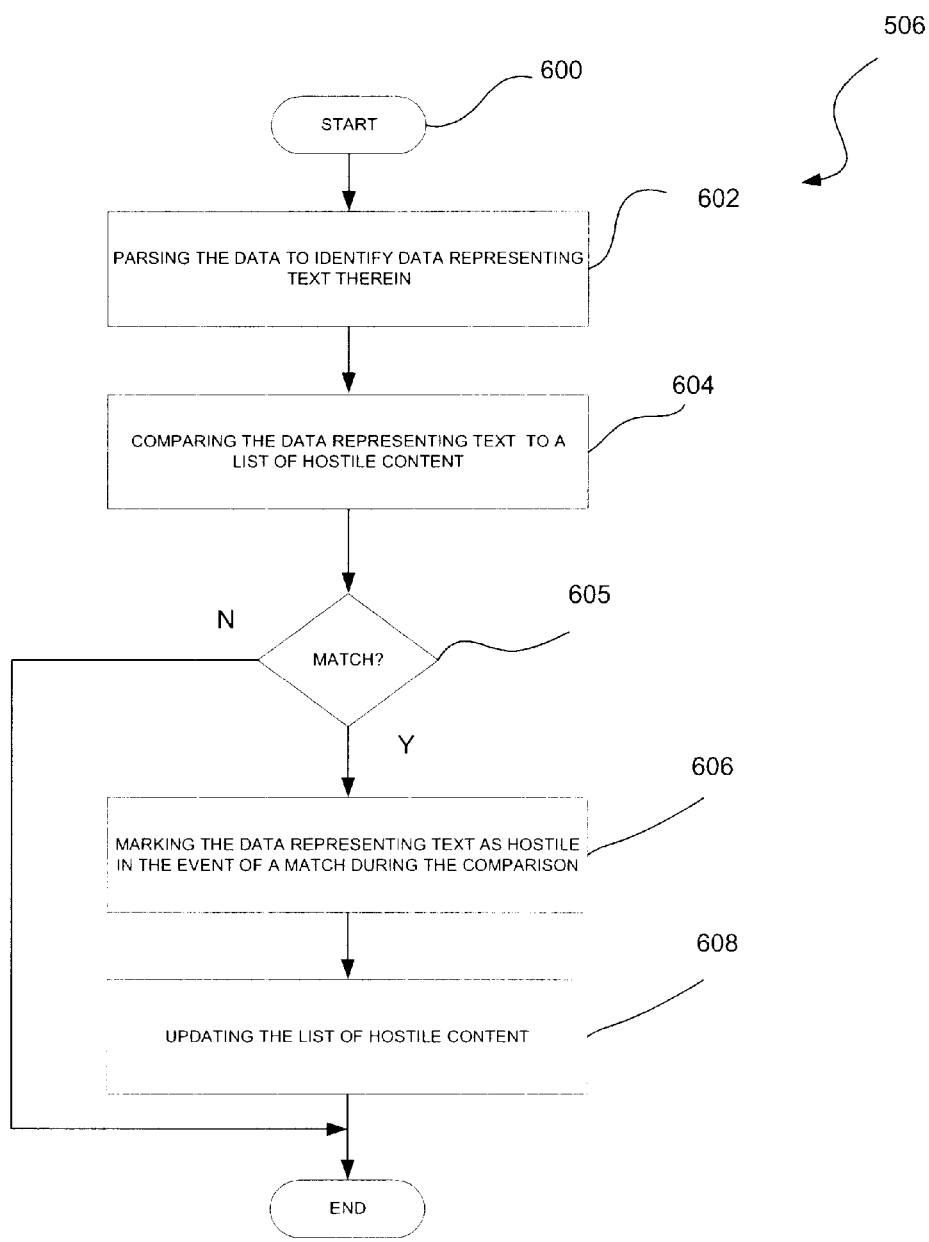
FIG. 6 illustrates a method of analyzing data in accordance with the method of FIG. 5.

FIG. 6 illustrates a method 600 of analyzing data in accordance with operation 506 of FIG. 5. As shown, the compiled data is parsed in operation 602 to identify data representing text (i.e. ASCII, UNICODE, or any other type of text, etc.) therein utilizing the intrusion detection system 404. It should be noted that such text may take the form of password requests, file requests, etc.

Thereafter, the data representing text is compared to a predetermined list of data representing text associated with attacks utilizing the intrusion detection system 404. Note operation 604. Table 1 illustrates an exemplary list of data representing text that may be associated with attacks.

TABLE 1

Common Linux Shellcode
"\xeb\x1f\x5e\x89\x76\x08\x31\xc0\x88\x46\x07\x89\x46\x0c\xb0\x0b"
"\x89\xf3\x8d\x4e\x08\x8d\x56\x0c\xcd\x80\x31\xdb\x89\xd8\x40\xcd"
"\x80\xe8\xdc\xff\xff\xff/bin/sh"
(or simply requests ending with the text /bin/sh)

Well-known vulnerability in IIS Web Server
"/scripts/..%c0%af../winnt/system32/cmd.exe"
(or simply requests which contain requests from/scripts and end with
/winnt/system32/cmd.exe)

Shellcode for x86 Computer Processor Architecture
Excessive numbers of consecutive 0x90 ("noop") bytes.

Shellcode for Sparc Computer Processor Architecture
Excessive numbers of consecutive sets of four bytes:
0xa61cc013

It should be noted that the data representing text of the predetermined list may refer to different types of attacks. For example, the types of attacks may include information gathering attacks, a web server denial of service attack, a file server remote compromise, and/or any other type of attack. Table 2 illustrates a non-exhaustive list of additional types of attacks that may be addressed in Table 1.

TABLE 2

| SYN Flood attack | Ping of death (fat ping attack) |
| IP spoofing | Malformed packet attacks (both TCP/UDP) |
| ACK storms | Forged source address packets |
| Network probes | Packet fragmentation attacks |
| Session hijacking | Log overflow attacks |
| SNMP attacks | Log manipulation |
| ICMP broadcast flooding | Source routed packets |
| Land attack | DNS cache corruption |
| ARP attacks | Mail spamming |
| Ghost routing attacks | DNS denial of service |
| Sequence number predict | FTP bounce or port call attack |
| Buffer overflows | ICMP protocol tunneling |
| Mail exploits | VPN key generation attacks |
| Authentication race attacks | |

In an alternate embodiment, the data may be parsed in operation 602 to identify binary data representing protocol field values. As such, the binary data may be compared to a predetermined list of patterns of binary data associated with attacks in operation 604. By this design, the present embodiment is capable of identifying harmful content in binary data streams (e.g. telnet, dns, etc).

Based on the comparison of operation 604, some of the data representing text is marked as hostile. See decision 605. In particular, if any of the data representing text identified in operation 602 matches any of the data representing text of the list (see Table 1), such matched data representing text is marked as hostile, as indicated in operation 606. Thereafter, the marked data representing text may be acted upon in order to prevent the attack, as indicated in operation 508 of FIG. 5. For reasons that will soon become apparent, the matching data representing text may be marked with an identifier corresponding to the type of the attack.

As an option, in operation 608, the predetermined list of data representing text associated with attacks (see Table 1) may be capable of being updated. Such update may be accomplished in any desired manner. For example, an administrator may update the appropriate file locally, or from afar utilizing the network. This may be accomplished in an automated, manual, and/or periodic manner.

Figure 7:
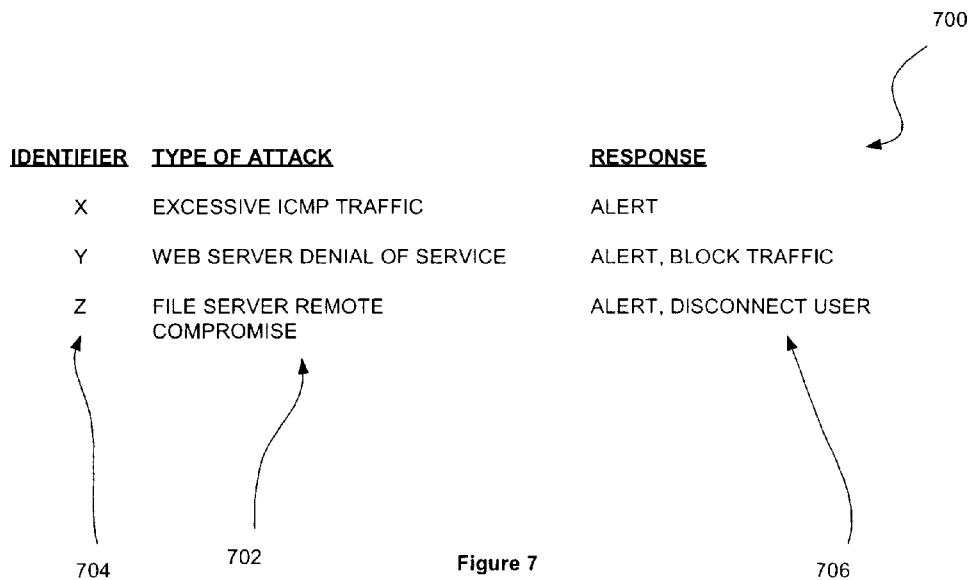
FIG. 7 illustrates an exemplary table dictating the manner in which the intrusion detection system responds to a hostile data representing text, in accordance with the method of FIG. 5.

FIG. 7 illustrates an exemplary table 700 dictating the manner in which the intrusion detection system 404 responds to the hostile data representing text, in accordance with operation 508 of FIG. 5. As shown, such table 700 outlines a plurality of types of attacks 702 each with an associated identifier 704. As mentioned earlier, the types of attacks 702 may include, but are not limited to information gathering attacks, a web server denial of service attack, a file server remote compromise, and/or any other type of attack on the targets 206. When the data representing text is identified as one of such hostile attacks 702, the data is assigned the appropriate identifier 704.

Given the appropriate identifier in operation 508 of FIG. 5, the intrusion detection system 404 is capable of determining the appropriate response 706. In one embodiment, responses may include alerting an administrator, blocking the data, disconnecting the remote source 102, and/or any other reaction to the hostile data.

In one exemplary embodiment, an information gathering attack may prompt an administrator alert. Further, a web server denial of service attack may warrant an administrator alert and/or a data block. Still yet, a file server remote compromise may result in the remote source 102 being disconnected and/or an alert being sent to the administrator.

The specific location and functionality of the intrusion detection system 404 is thus designed to analyze all traffic, regardless of type, and identify data that may be part of an attack against the targets 206 to be protected. By its incorporation with the firewall architecture 400, the intrusion detection system 404 is capable of analyzing all incoming data and identifying threats before hostile data reaches a switched or segmented network, i.e. VLAN, that would otherwise render the data invisible to a conventional intrusion detection system 404.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting attacks on a network, comprising:

at a gateway, receiving data from a remote source which is destined for a target;

discarding the data based on a predetermined set of rules utilizing a firewall associated with the gateway which is coupled to the remote source, wherein the firewall utilizes the predetermined set of rules to discard the data as a function of a plurality of parameters selected from the group consisting of a source, a destination, and a port associated with the data;

passing remaining data to an intrusion detection system coupled to the firewall associated with the gateway;

receiving the remaining data utilizing the intrusion detection system;

parsing the remaining data to identify data representing text therein utilizing the intrusion detection system;

comparing the data representing text to a predetermined list of data representing text associated with attacks utilizing the intrusion detection system, wherein the data representing text of the predetermined list refers to different types of attacks selected from the group consisting of information gathering attacks, a web server denial of service attack, and a file server remote compromise;

identifying the data representing text as hostile based on the comparison;

acting on the data representing text identified as hostile in order to prevent an attack, wherein the data representing text identified as hostile is acted upon differently based on the type of the attack by at least one of blocking the data, alerting an administrator, and disconnecting the remote source; and updating the predetermined list of data representing text associated with attacks;

wherein the firewall and the intrusion detection system are included in a single device.

2. The method as recited in claim 1, wherein the remaining data is assembled utilizing the intrusion detection system.

3. The method as recited in claim 1, wherein the firewall utilizes the predetermined set of rules to discard the data as a function of a plurality of parameters including the source, the destination, and the port associated with the data.

4. The method as recited in claim 1, wherein the data representing text of the predetermined list refers to different types of attacks including the information gathering attacks, the web server denial of service attack, and the file server remote compromise.

5. The method as recited in claim 1, wherein the predetermined list of data representing text associated with attacks is manually updated.

6. The method as recited in claim 1, wherein the data representing text identified as hostile is marked with an identifier based on the comparison, the identifier being used to determine the manner in which the data representing text identified as hostile is acted upon.

7. A gateway system for detecting attacks on a network, comprising:

a firewall for receiving data from a remote source which is destined for a target, and discarding the data based on a predetermined set of rules, wherein the firewall utilizes the predetermined set of rules to discard the data as a function of a plurality of parameters selected from the group consisting of a source, a destination, and a port associated with the data;

an intrusion detection system coupled to the firewall for receiving remaining data, parsing the remaining data to identify data representing text therein, and comparing the data representing text to a predetermined list of data representing text associated with attacks, wherein the data representing text of the predetermined list refers to different types of attacks selected from the group consisting of information gathering attacks, a web server denial of service attack, and a file server remote compromise, the intrusion detection system further capable of identifying the data representing text as hostile based on the comparison, and acting on the data representing text identified as hostile in order to prevent an attack, wherein the data representing text identified as hostile is acted upon differently based on the type of the attack by at least one of blocking the data, alerting an administrator, and disconnecting the remote source, the intrusion detection system further capable of updating the predetermined list of data representing text associated with attacks;

wherein the firewall and the intrusion detection system are included in a single device.

8. The system as recited in claim 7, wherein the remaining data is assembled utilizing the intrusion detection system.

9. The system as recited in claim 7, wherein the firewall utilizes the predetermined set of rules to discard the data as a function of a plurality of parameters including the source, the destination, and the port associated with the data.

10. The system as recited in claim 7, wherein the data representing text of the predetermined list refers to different types of attacks including the information gathering attacks, the web server denial of service attack, and the file server remote compromise.

11. The system as recited in claim 7, wherein the predetermined list of data representing text associated with attacks is manually updated.

12. The system as recited in claim 7, wherein the data representing text identified as hostile is marked with an identifier based on the comparison, the identifier being used to determine the manner in which the data representing text identified as hostile is acted upon.

* * * * *

Adverse Decision in Interference

Patent No. 6,513,122, James S. Magdych, Tarik Rahmanovic, John R. McDonald, Brock E. Tellier, Anthony C. Osborne, Nishad P. Herath, SECURE GATEWAY FOR ANALYZING TEXTUAL CONTENT TO IDENTIFY A HARMFUL IMPACT ON COMPUTER SYSTEMS WITH KNOWN VULNERABILITIES, Interference No. 105,271, final judgment adverse to the patentees rendered March 24, 2005, as to claims 1-12.

*(Official Gazette February 13, 2007)*